June 21, 1955   C. N. SHOWALTER   2,711,239
LATCH FOR PLANTER POWER LIFTS
Filed Aug. 5, 1950   3 Sheets-Sheet 1
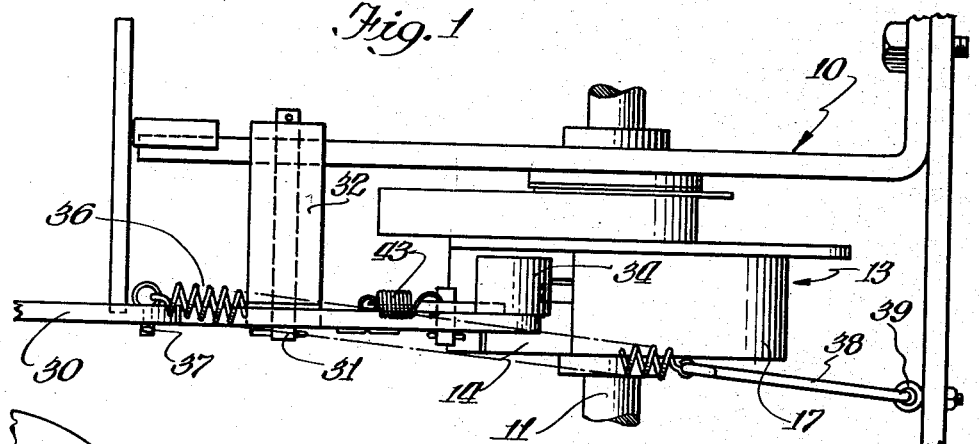
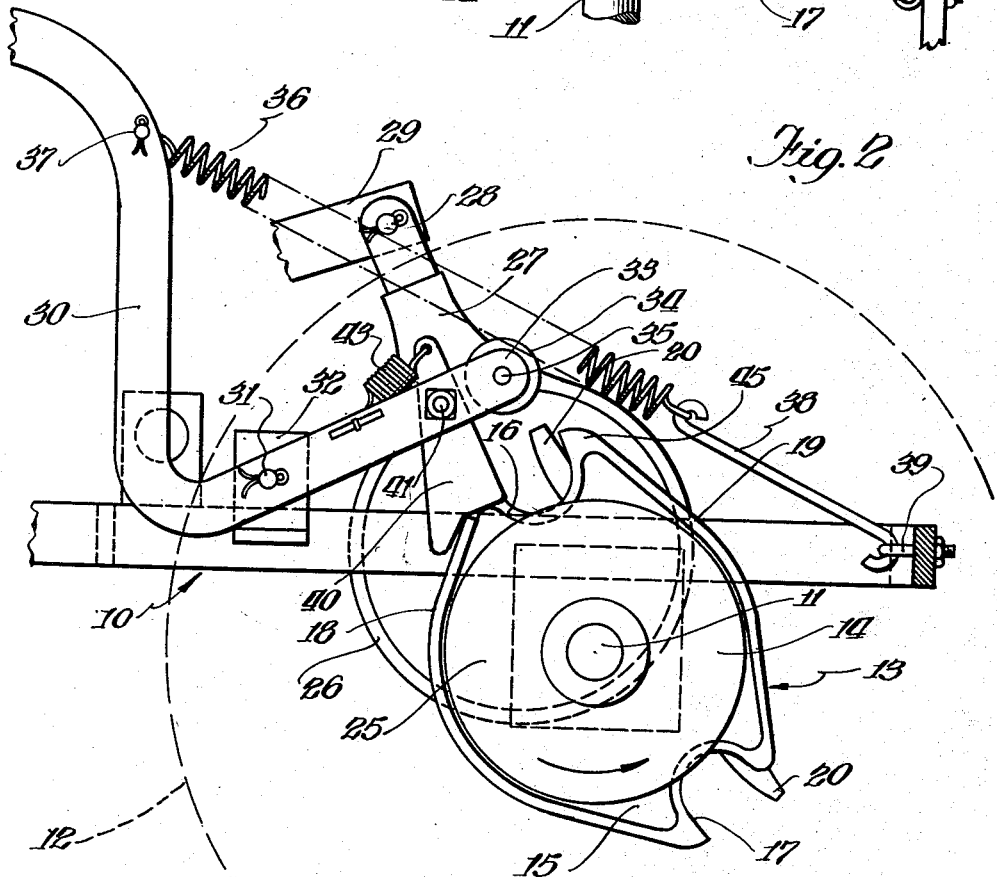
Inventor:
Carl N. Showalter
By: Paul O. Pippel
Atty.

June 21, 1955  C. N. SHOWALTER  2,711,239
LATCH FOR PLANTER POWER LIFTS
Filed Aug. 5, 1950  3 Sheets-Sheet 2
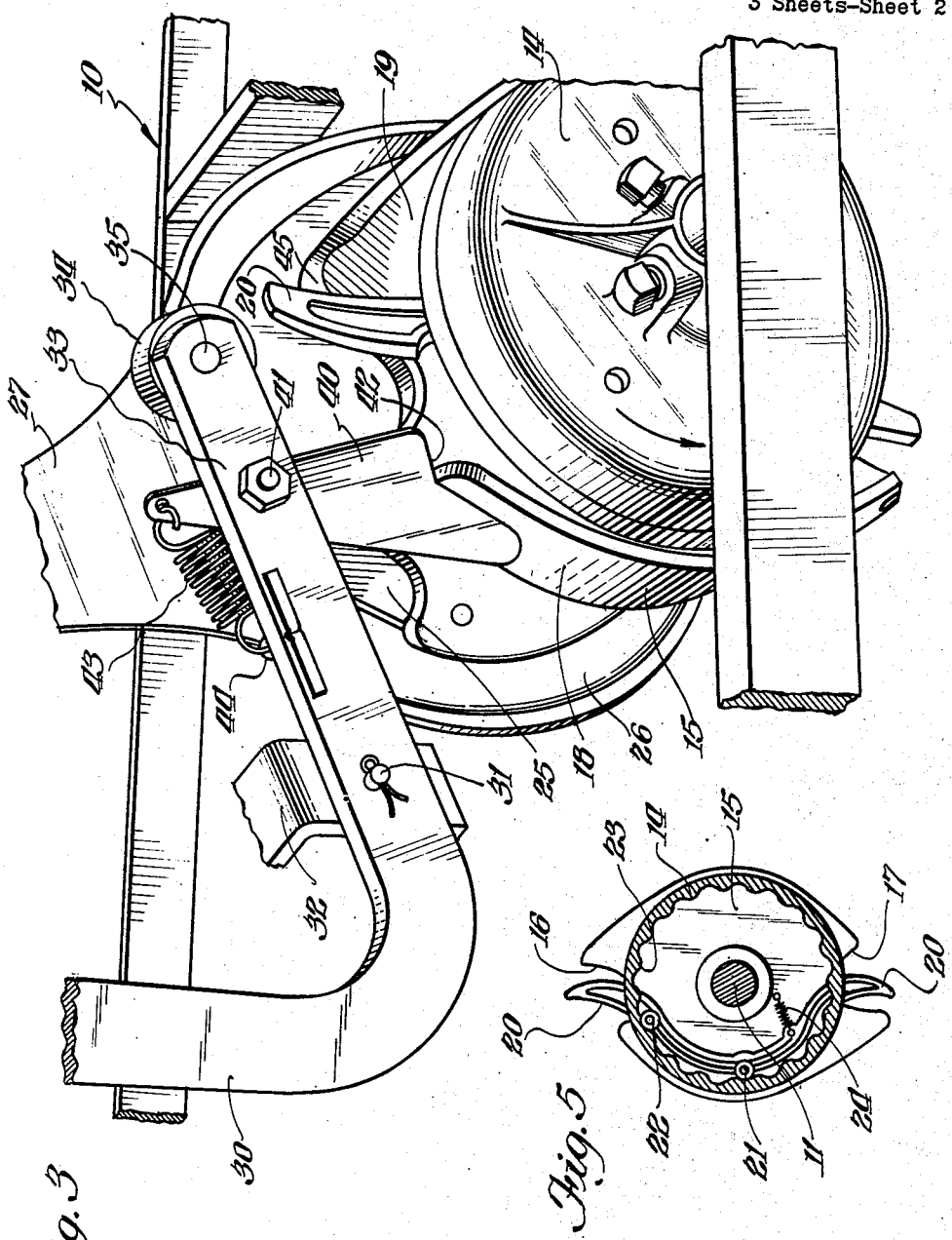
Inventor:
Carl N. Showalter
By: Paul O. Pippel
Atty.

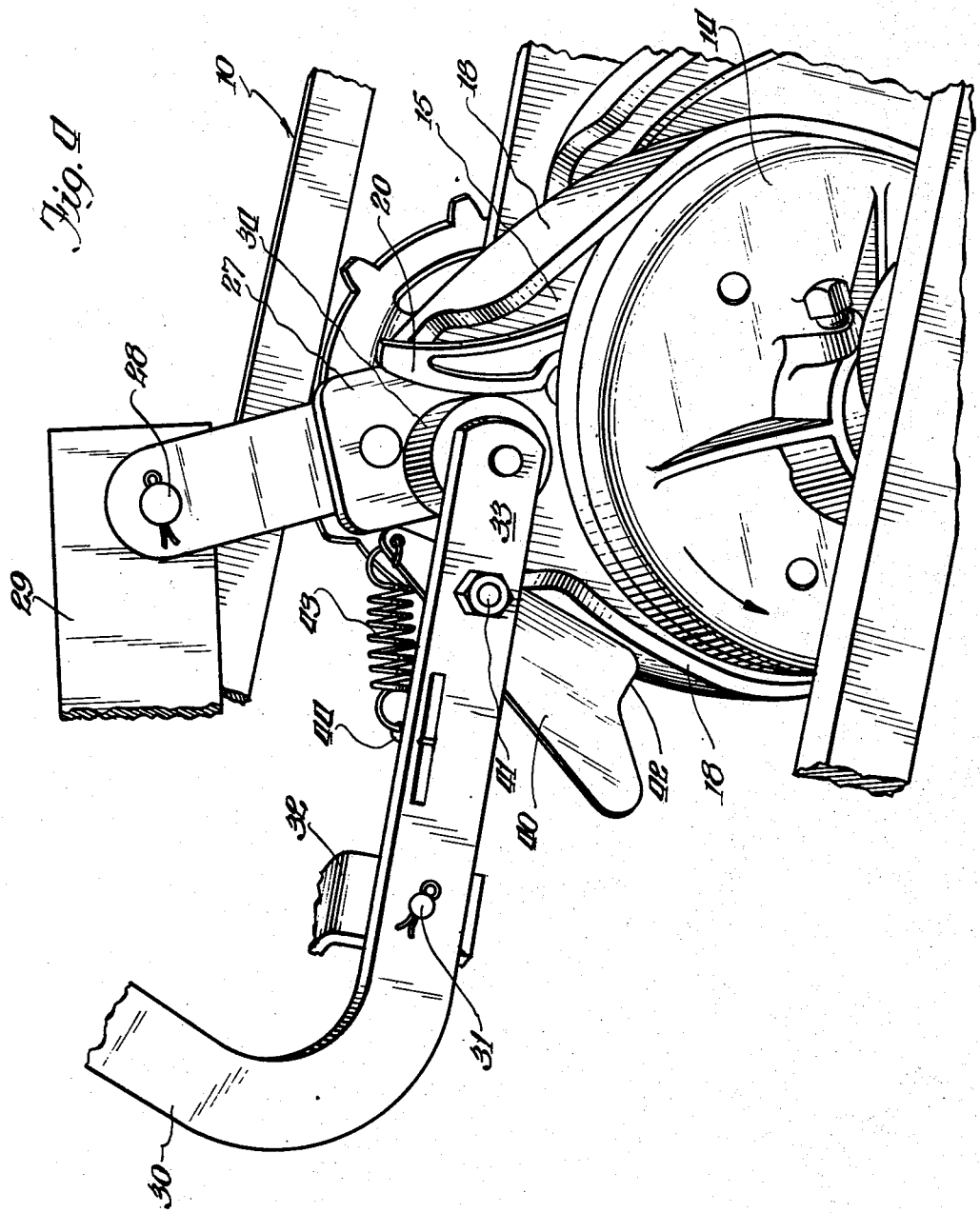

United States Patent Office 2,711,239
Patented June 21, 1955

2,711,239

LATCH FOR PLANTER POWER LIFTS

Carl N. Showalter, Fountain City, Ind., assignor to International Harvester Company, a corporation of New Jersey Application August 5, 1950, Serial No. 177,906

7 Claims. (Cl. 192—62)

This invention relates to agricultural implements, and particularly to power lift mechanism therefor. More specifically, the invention concerns a planter or the like and improvements in mechanism by which the earth working units are raised and lowered.

The invention particularly concerns the type of lifting device known as a half-revolution cycle clutch. This clutch is driven from the ground wheels of the planter and includes a clutch member which is secured to the wheel axle and therefore rotates constantly with it. Another clutch member is journaled on the axle, and driving contact is made between the members by a dog carried by the second mentioned clutch member and having a part thereon engageable with grooves in the first clutch member. This dog is normally held out of driving engagement by a roller carried by a manually controlled lever which is spring biased to maintain the roller in engagement with the dog. The driven or second clutch part is operatively connected with the furrow opener units to effect raising or lowering thereof upon actuation of the clutch. In order to move the earth working elements to or from operating position the operator of the machine moves the control lever to withdraw the roller and permit engagement of the clutch parts. He then releases the lever and the roller rides upon the periphery of the clutch while the latter is rotating through a half revolution due to the forward motion of the machine. The roller drops into a recess and again engages the dog, releasing the driven clutch part from engagement with the driving part. The proper operation of the clutch is thus dependent upon the forward motion of the machine.

Upon reaching the end of a field a planter operator turns his machine to make the return trip across the field in the opposite direction. Upon making the turn he also pulls the control lever to remove the roller from its recess engagement with the clutch dog. This is sufficient in the normal forward motion of the machine to start the clutch parts revolving so that the roller will not fall back in the same notch when the lever is released, but will ride upon the clutch periphery through a half revolution until the opposite recess is encountered, whereupon the dog is again engaged. However, in turning, the wheel upon which the turn is made does not participate in forward motion and may not turn at all, or it may turn backwards. In such cases there will be no rotation of the clutch parts and the roller on the lever will drop back into the recess without having executed the lifting or lowering operation.

The object of the present invention is to provide mechanism assuring the operation under all conditions of a power lift device of the type described.

Another object of the invention is to provide in a power lift clutch of the type described, means automatically operable upon release of the control lever for holding the associated roller out of engagement with the clutch dog until the forward motion of the wheels causes rotation of the clutch parts.

Another object of the invention is to provide in a power lift clutch of the type described, latch means for holding the dog-engaging roller in inoperative position until the clutch parts have rotated past the dog-engaging position.

Other objects and advantages of the invention will become clear from the following detailed description when read in conjunction with the accompanying drawings wherein:

Fig. 1 is a plan view of a portion of the planter frame showing a wheel axle and lift mechanism embodying the features of this invention mounted thereon.

Fig. 2 is a view in side elevation of the structure shown in Fig. 1 indicating in dotted lines the position of the ground engaging wheel from which power is derived for operating the lift mechanism.

Fig. 3 is an enlarged perspective view of a detail of the power lift clutch parts, showing the control lever out of the notch and the latch mechanism in operative position.

Fig. 4 is also an enlarged detail in perspective showing the control lever roller seated in the notch in the clutch plate and engaging the dog to disconnect the drive between the clutch members.

Fig. 5 is a sectional view of the power lift clutch showing some of the constructional details thereof.

In the drawings, the numeral 10 designates generally the frame of a planter supporting for rotation a transverse axle 11 upon which are mounted one or more wheels adapted to support the planter with respect to the ground, and one such wheel being indicated in dotted lines at 12 in Fig. 2. The construction of the planter with which this invention is concerned is conventional and familiar to those skilled in the art. Therefore the presence of such elements as seed containers, dispensing mechanism and furrow opener units is understood although they are not shown.

Mounted on the wheel shaft 11 is a half-revolution clutch 13 comprising a drum 14 which is a constantly rotatable member mounted upon and secured to the wheel shaft 11 to be driven thereby. Likewise mounted coaxially with drum 14 on the shaft and rotatable with respect thereto is a clutch plate 15 having recesses or notches 16 and 17 in the periphery thereof approximately 180° apart. Clutch plate 15 is an intermittently rotatable member having flange portions 18 and 19.

The clutch plate 15 is adapted to be driven by the driving clutch member 14 and for this purpose a clutch dog 20 is provided pivotally mounted upon a pin 21 secured to the plate 15 at the center of the dog as clearly shown in Fig. 5. The ends of the dog 20 project in the recesses 16 at opposite sides of the clutch plate 15 and a roller 22 mounted upon the clutch dog is arranged to engage grooves 23 formed on the inner periphery of the driving clutch member 14. A spring 24 connected between dog 20 and the plate 15 urges the roller 22 into engagement with the grooved periphery of the driving member 14.

When the roller 22 is seated in one of the grooves 23 of the driving member 14 drive is transmitted to the plate member 15. Also secured to the plate 15 is an eccentric member 25 which is rotatable with the intermittently rotatable clutch plate 15 eccentrically to the axis of the shaft 11. Mounted upon the eccentric 25 and rotatable with respect thereto is a band 26 having thereon a projection 27 to which is pivotally connected at 28 one end of a lifting link 29. The lifting link 29 is operatively connected in any suitable manner (not shown) to the earth working elements of the planter. Rotation of the intermittently rotatable clutch member 15 causes the eccentric 25 to revolve within the band 26 causing corresponding movement of the projection 27 and the lifting link 29.

The clutch plate 15 is normally held out of driving engagement with the driving clutch member 14 by mechanism comprising a control lever 30 pivoted upon a pin 31 carried in a lug 32 mounted on the frame 10 of the machine. Lever 30 has an arm 33 provided at its end with a roller 34 mounted upon a pin 35 adapted to be received in one of the recesses 16 or 17 of the intermittently driven clutch plate. As shown in Fig. 4 the roller 34 is seated in one of the notches in the periphery of the clutch plate and bears against the dog 20. In this position with the dog engaged by the roller 34 of the control lever the roller 22 carried by the dog is held out of engagement with the grooves 23 of the driving clutch member, so that the plate 15 and the eccentric 25 do not rotate and no movement is imparted to the lifting link 29. The roller is biased to the position in engagement with the clutch and reception in one of the recesses in the clutch plate by a spring 36 anchored at one end to a pin 37 on the control lever handle and at its other end to a rod 38 which in turn is anchored to an eye-bolt 39 affixed to the frame of the machine.

In the position of the parts indicated in Figs. 1 and 2 the earth working elements of the planter unit are in a lowered position. This is also the position of the parts indicated in Fig. 3. When it is desired to raise the furrow opener units of the planter to transport position the operator of the machine grasps the handle of the lever 30 to rock it about its pivot 31 against the action of the spring 36 to remove the roller from the recess in the clutch plate. This is a customary procedure when turning the machine at the end of a field. The operator then releases the control lever 30. If the machine were traveling forwardly this forward motion would be transmitted through the driving member 14 to the driven plate 15 upon release of the roller 34 from engagement with the dog 20 and the clutch plate would begin immediately to revolve. The operator customarily rocks the lever 30 to remove the roller 34 from the notch and then releases it and allows it to return to the clutch through the action of the spring 36. With the machine moving forwardly the clutch plate 15 rotates so that, upon return of the control lever, the roller 34 will engage the outer surface of one of the flanges 18 or 19, and, upon rotation of the clutch plate through 180°, would be received in the other peripheral recess formed in the clutch plate to again engage the dog and disconnect the drive between the clutch elements. The clutch will have passed through its cycle to vertically move the earth working unit of the planter in one direction.

As pointed out before, however, it very frequently happens that the wheel 12 which drives the clutch is not undergoing forward motion at the time the turn is made and at the time the operator releases the roller from the clutch recess by tripping the control lever 30. Under such circumstances, upon release of the lever 30 and return of the roller 34 to the clutch, the clutch plate 15 will not have had an opportunity to revolve and the roller will again be received in the same recess from which it was withdrawn. The planter units having been lifted for the return, they will remain lifted until the machine is in forward motion and the operator again trips his control lever 30 to initiate the driving of the clutch parts.

In order to avoid the disadvantage referred to, applicant provides a latch mechanism to prevent the return of the control lever roller to the notch in the clutch plate until the forward motion of the machine has begun to turn the clutch plate and cause the notch therein to pass the position where it would receive the roller. This latch mechanism comprises a latch tongue 40 which is pivotally mounted upon a bolt 41 carried by the arm 33 of lever 30. The latch tongue is generally triangular in shape and has a recessed portion providing a shoulder 42 at its lower end. The upper end is apertured to provide an anchor for one end of a spring 43, the other end of which is secured to a pin 44 carried by the lever. When the roller 34 is in position in one of the notches 16 or 17 the latch tongue 40 is in the position indicated in Fig. 4 pressing against the flange 18 of the clutch plate 15 and urged thereagainst by the spring 43. Upon rocking the control lever 30 to raise the roller 34 out of the recess the latch tongue 40 moves to the position indicated in Figs. 2 and 3 with the shoulder 42 of the tongue resting against the upper edge of the flange portion 18. With the dog forming a driving connection between the driving and driven clutch elements the clutch plate 15 begins to turn in the direction of the arrows indicated in the drawings, and the lip 45 of the recess engages and trips the latch tongue 40, allowing the roller 34 to ride upon the surface of the flange portion 19 until the notch at the opposite side of the clutch plate is encountered, whereupon the roller 34 again becomes seated and presses against the dog 20, again disconnecting the drive between the clutch elements.

It is believed that the novel latch mechanism for a cycle clutch disclosed herein will be clearly understood from the foregoing description. It is likewise understood that modifications may be made in the invention without departing from the spirit thereof or the scope of the appended claims.

What is claimed is:

1. For use with an implement having a ground engaging wheel, a clutch deriving power from said ground engaging wheel comprising a constantly rotatable member driven by said wheel, an intermittently rotatable member having a dog engageable with the constantly rotatable member to transmit driving motion therebetween, a control lever having a part normally biased to engagement with said dog to hold the latter out of driving engagement with the constantly rotatable member, said lever being movable to release said part from engagement with the dog, and a latch associated with said control lever and engageable with the intermittently rotatable member to hold said part out of engagement with the dog until after said intermittently rotatable member has begun to revolve.

2. For use with an implement having a ground engaging wheel, a clutch deriving power from said ground engaging wheel comprising a constantly rotatable member driven by said wheel, an intermittently rotatable member having a dog engageable with the constantly rotatable member to transmit driving motion therebetween, a control lever having a part normally biased to engagement with said dog to hold the latter out of driving engagement with the constantly rotatable member, said lever being movable to release said part from engagement with the dog, and a latch associated with said control lever and engageable with the intermittently rotatable member to hold said part out of engagement with the dog until after said intermittently rotatable member has begun to revolve, said latch being releasable in response to rotation of the intermittently rotatable member.

3. For use with an implement having a ground engaging wheel, a clutch deriving power from said ground engaging wheel comprising a constantly rotatable member driven by said wheel, an intermittently rotatable member, a movable member carried by the intermittently rotatable member providing a driving connection between said clutch members, a control lever having a part engageable with said movable member to hold it out of driving contact with the constantly rotatable member, said lever being movable to release the said part from engagement with the movable member, whereby driving connection is made between the clutch members to cause the intermittently rotatable member to rotate with the constantly rotatable member, resilient means biasing the lever part to engagement with the movable member, and latch means associated with said lever for holding the lever out of operative engagement with said movable member until it has been moved out of operative relationship with said part by rotation of the clutch member.

4. For use with an implement having a ground engaging wheel, a cycle clutch comprising a constantly rotatable member driven by said ground engaging wheel, an intermittently rotatable member adapted to be revolved through a cycle by the constantly rotatable member, a clutch dog providing a driving connection between the clutch members, a control lever adapted to maintain the dog out of engagement with the constantly rotatable member, said lever being movable to release the dog and cause the intermittently rotatable member to revolve through its cycle, said lever being biased to contact the periphery of the clutch and reengage the dog at the completion of said cycle and interrupt the driving of the intermittently rotatable member, and means associated with said lever and engageable with said intermittently rotatable member, said means being automatically operable upon movement of the lever to release the dog to maintain the lever out of contact with the clutch until rotation of the clutch members has begun, whereby reengagement of the lever with the clutch dog is prevented until the cycle of rotation has been completed.

5. For use with an implement having a ground engaging wheel, a cycle clutch comprising a constantly rotatable member driven by said ground engaging wheel, an intermittently rotatable member adapted to be revolved through a cycle by the constantly rotatable member, a clutch dog providing a driving connection between the clutch members, a control lever adapted to maintain the dog out of engagement with the constantly rotatable member, said lever being movable to release the dog and cause the intermittently rotatable member to revolve through its cycle, said lever being biased to contact the periphery of the clutch and reengage the dog at the completion of said cycle and interrupt the driving of the intermittently rotatable member, and latch means associated with the lever and movable into latching relation with the intermittently rotatable member for holding the lever out of contact with the clutch upon movement of the lever to release the dog until rotation of the clutch members has begun, said latch being released in response to rotation of the clutch.

6. In a cycle clutch, a driving member, a member adapted to be driven through a fixed cycle by the driving member, means forming a driving connection between said members and projecting radially therefrom, a control lever having a part adapted to ride on the periphery of the driven member upon rotation thereof through its cycle and to engage said connecting means to break the driving connection and stop the rotation of the driven member, said lever being movable to release said part from engagement with said connecting means and permit rotation of the clutch members, and means associated with the lever and engageable with said driven member and operable, upon movement of the lever to release said part, for maintaining the latter out of engagement with the connecting means until the cycle of rotation of the driven member has begun.

7. In a cycle clutch, a driving member, a member adapted to be driven through a fixed cycle by the driving member, means forming a driving connection between said members and projecting radially therefrom, a control lever having a part adapted to ride on the periphery of the driven member upon rotation thereof through its cycle and to engage said connecting means to break the driving connection and stop the rotation of the driven member, said lever being movable to release said part from engagement with said connecting means and permit rotation of the clutch members, and means operable upon movement of the lever to release said part for maintaining the latter out of engagement with the connecting means until the cycle of rotation of the driven member has begun comprising a latch carried by the lever, said latch being tripped by the rotation of the clutch member to return the lever and its part to operative position.

References Cited in the file of this patent

UNITED STATES PATENTS

| 1,394,767 | Smith | Oct. 25, 1921 |
| 2,156,362 | Strandlund | May 2, 1939 |